United States Patent
Gill

Patent Number: 5,715,857
Date of Patent: Feb. 10, 1998

[54] MULTI-USE VALVE

[76] Inventor: Ajit Singh Gill, 4169 Bennion Rd., Salt Lake City, Utah 84119

[21] Appl. No.: 565,949

[22] Filed: Dec. 1, 1995

[51] Int. Cl.⁶ .................................................. F16K 1/00
[52] U.S. Cl. ........................ 137/219; 137/220; 137/508; 137/614.2
[58] Field of Search .................................. 137/219, 220, 137/508, 614.2

[56] References Cited

U.S. PATENT DOCUMENTS

5,069,248  12/1991  Gill ............................................ 137/613
5,387,017  2/1995   Gill ......................................... 251/149.8 X

*Primary Examiner*—Gerald A. Michalsky
*Attorney, Agent, or Firm*—Mallinckrodt & Mallinckrodt

[57] ABSTRACT

A multi-use flow control and pressure reducing valve includes an inlet chamber, an intermediate chamber, and an outlet chamber. An hydraulic gate member forms the outlet chamber and controls communication between the intermediate chamber and outlet chamber to control flow of fluid through the valve. The hydraulic gate also establishes a control or actuating chamber for receiving fluid therein to control the position of the hydraulic gate. The valve is separable in the axial direction into at least two parts for removal, cleaning, or repair with the two parts coupled and held together during use preferably by an easily operated coupling device.

22 Claims, 8 Drawing Sheets

MULTI-USE VALVE

BACKGROUND OF THE INVENTION

1. Field: The invention is in the field of flow control and pressure reducing valves, check valves, gates and shutoff valves to control fluid flow in pipes.

2. State of the Art: Common types of valves currently in use to control axial flow of fluids through a pipe line are gate valves, rotary ball valves and butterfly valves. These valves lay directly in the path of the axial flow of fluid to block the flow.

Other types of valves to control flow of fluids are globe style, and cage valves and their variation. They all have stems to move the diaphragm or the plug.

Other types of valves use dynamically balanced plugs positioned to move axially along the valve center line parallel to the flow path. This axial movement determines the annular space between the plug and the body. A fluid controlled cylindrical chamber in the body of the plug that actuates the plug is located at the center of the tubular body. The controlled flow passes around the plug and inside the tubular body; and passes outside of the tubular body, around the bridgewall, and into the tubular body again. Said bridge in the above valves with passages for the fluid, extends parallel to the axis of the valve over the entire range of the valve body. But in the valve of this invention, said bridge has discontinuity at the end of partition plate. Then there is my invention of a hydraulic gate shown under U.S. Pat. No. 5,069,248 which is located inside a tube with partition plate and a plurality of passages extending from the inlet chamber to the outlet chamber around and through the partition plate. The hydraulic gate is entirely contained inside the inlet chamber. The larger diameter of the gate is equal to the inner diameter of the inlet chamber which is the inner diameter of the inlet pipe. In the above invention, elastomeric means occupied the entire space around the passages except the walls of cavities to hold the diaphragm. Even when the elastomeric means are not being used, the size of the hydraulic gate cannot be enlarged to enhance certain flow characteristics which are gained with a valve of a larger diameter. A valve of large diameter reduces cavitation and it handles larger flow, and when opened fully has less frictional losses, which is desired in certain applications to conserve energy.

Size for size the valve of this invention weighs the least among pressure reducing valves and it has the least length. Its design allows easy access to examine the hydraulic gate inside the valve body. This invention makes it possible to increase the diameter of the valve while at the same time cutting its length considerably and improving its fluid flow characteristic. The use of my invented coupling under U.S. Pat. No. 5,387,017 makes the valves' construction possible and easy, because the weight of the coupling is very small and also it can quickly be engaged or disengaged. In case of very large valves the valve can be shipped by parts which are easily assembled on site. Shipping weight of the valve can be divided into parts, therefore, the handling and assembling of larger valves present no problem and require no heavy equipment.

The invented valve has fixed partition plate to block the flow of fluid, which plate, also can be made to be movable, and sensitive to pressure difference. Differential pressure around the movable plate makes it to slide from one extreme end to another end of a chamber, provided with a plurality of passages for the fluid. Thus, the invented valve provided with a movable partition plate, when used as a shutoff valve for pumps, also can act as a check valve. Thus, a separate check valve is not needed.

The valves discussed so far under this class which can be contrasted with this new invention have tubular bodies, which contain an inner tube and the inner tube contains the plug or the hydraulic gate, and the end of the plug or the gate blocks the flow of the fluid. In this new invention the flow is blocked by the middle portion of the hydraulic gate rather than by the end of the hydraulic gate mounted in side the inner tubular chamber. Further, the blocking portion of the hydraulic gate is situated outside the inner tube having passages, and it also is situated outside the partition plate. By over reaching the partition plate, the gate of the new invention extends and reaches the outer body of the valve to create an actuating fluid control chamber, which actuates the hydraulic gate. The invention also eliminates the need for the adjoining or built-in reducer. Thus unique geometry produces a valve with the least length, with a larger diameter and, with superior flow characteristics and other attributes. The construction of the valve becomes easier and requires less materials.

Valves in the pipe lines are protected with expansion joints. The valve body of this invention is provided with a joint which can slip, therefore, the valve of this invention installed in a pipe line with short reaches, acts also as an expansion joint, and eliminates the need for an expansion joint.

The valve has an outer joint, which can slip. To examine the inner core for inspection, the valve quickly can be split in two parts in the axial direction while in line

SUMMARY OF THE INVENTION

According to the invention, a Multi-use flow control and pressure reducing valve includes a composite valve body divided into two major parts "P1" and "P2", having at least one separable joint in outer cylindrical portion of the valve body. Said parts are separable along the axial direction, and are preferably manufactured by casting or fabrication. The first part designated as "P1", has an inlet chamber "A" and partition means located centrally in the valve body ends in discontinuity, and takes the form of a wall or a plate or a movable wall or a movable plate extending symmetrically from the axis of the central bore to the cylindrical wall of the inlet chamber. In one embodiment, adjacent to the inlet of the inlet chamber, an external circumferential groove is provided in the cylindrical embodiment adapted to make connection with the upstream pipe by means of a coupling. Down stream, adjacent to the groove, a truncated conical section rises which extends outward and reaches internally to one end of the cylindrical outer body of second major part of the valve body designated as "P2", which is adapted to make a connection with the first part "P1" by means of a coupling. A plurality of passages are formed in the wall of the cylindrical inlet chamber which is situated between said truncated conical section and the partition means with discontinuity. Passages open into the outer chamber "B" created by the connection of part "P1" and part "P2" of the valve body. The outer chamber is divided into two chambers by the gate; intermediate chamber "B" and fluid actuating chamber "D". The hydraulic gate is mounted inside the second part "P2" of the valve body.

The second part "P2" is formed by two tubes connected by a truncated conical section, the end of the outer tube having larger diameter incorporates a jaw coupling connectable to the truncated conical end of part "P1". A slidable hydraulic gate mounted inside of part "P2" of the valve body creates a fluid actuating chamber "D", which actuates the gate to slide back and forth according to the volume of the fluid inside chamber "D". The inner cylindrical portion of the hydraulic gate, is mounted to slide inside the end portion of part "P2" and adjacent end of the pipe, and it creates a chamber designated as "C". The face of the gate with a variable diameter extends toward the partition means and it rises from the cylindrical tube slidable inside the outlet portion of "P2" of the valve body. Preferably, the face of the hydraulic gate extends over and beyond the partition means and reaches inner surface of the outer tube of part "P2" of the valve body. Means are provided to supply pressurized fluid to the fluid actuated chamber "D" to actuate the hydraulic gate by means of conventional controls for the valves. External cicumferential grooves are formed adjacent to both ends of part "P1" and part "P2" of the valve body. Outer grooves of "P1" and "P2" are engaged by a coupling to join part "P1" with part "P2" to make the valve body, and grooves on opposite ends are engaged by two couplings to make connections with the inlet and outlet pipes. The construction of the valve so far discussed has an inlet chamber "A" with an inner diameter equal to the inner diameter of the outlet portion of part "P2", and said inner diameters are equal to the inner diameters of the inlet and outlet pipes connected to the ends of the valve. The major end of the part "P2" incorporates my coupling invented under U.S. Pat. No. 5,387,017.

In another embodiment of the valve instead of forming grooves adjacent to the two ends of the valve body, my above invented coupling is integrally incorporated at the two ends of the valve body, and same coupling is incorporated again in said major end of part "P2" of the valve body to connect it to part "P1" of the valve body. The end couplings of this embodiment can engage the circumferential grooves or shoulders provided near the ends of the inlet and outlet pipes to secure attachment of the valve with the inlet and outlet pipes. In this embodiment of the valve, the valve is mounted over and around the inlet and outlet pipes, and axial separation of part "P1" from part "P2" takes place around the inlet and outlet pipe. Thus, it is not necessary to remove the valve from the pipe line, if the core of the valve needs examination.

The valve of this invention has an outer axial inwardly slipping joint. This valve installed in the pipe line having short reaches, can function as an expansion joint, because, its outer joint permits inward an axial slippage.

The valve can be provided with one or more compression springs to enhance force of the hydraulic gate against the fluid, or it can be provided spring loaded drives to close the gate or to lock it in a desired open position. Where the need of cleaning of the valve is frequent the outer cylindrical portion of part "P2" can be made of my said patented coupling, which will provide a removable cover for the valve. It is also possible that cover's one end has coupling and the other end has restriction ring which will permit only inward axial slippage of the truncated conical portion of part "P2". Uninterrupted fluid flows from the inlet chamber to the intermediate chamber, which is walled and blocked by the face of hydraulic gate on one side and on all other sides is enclosed by the body of the valve. When the gate is opened the fluid passes from the intermediate chamber to the outlet chamber inside the cylindrical body of the gate, thence, out to the pipe.

THE DRAWINGS

In the accompanying drawings, which illustrate the best mode presently contemplated for carrying out the invention.

DETAILED DESCRIPTION OF THE ILLUSTRATED EMBODIMENT

All the figures in the drawings will be studied simultaneously. Except for the openings shown by 1k, 2k, 23, and 23A in the figures, and the springs shown by 9 and 10, and 9A; and the drive assembly shown by 6 and 14 in FIG. 2, and the bolts shown with the jaws of the couplings and the connectors from 48 to 52 and connectors shown in FIG. 6, to operate the valve, all transverse vertical sections of different elements in the valve will appear as rings having axial symmetry.

Figure 1:
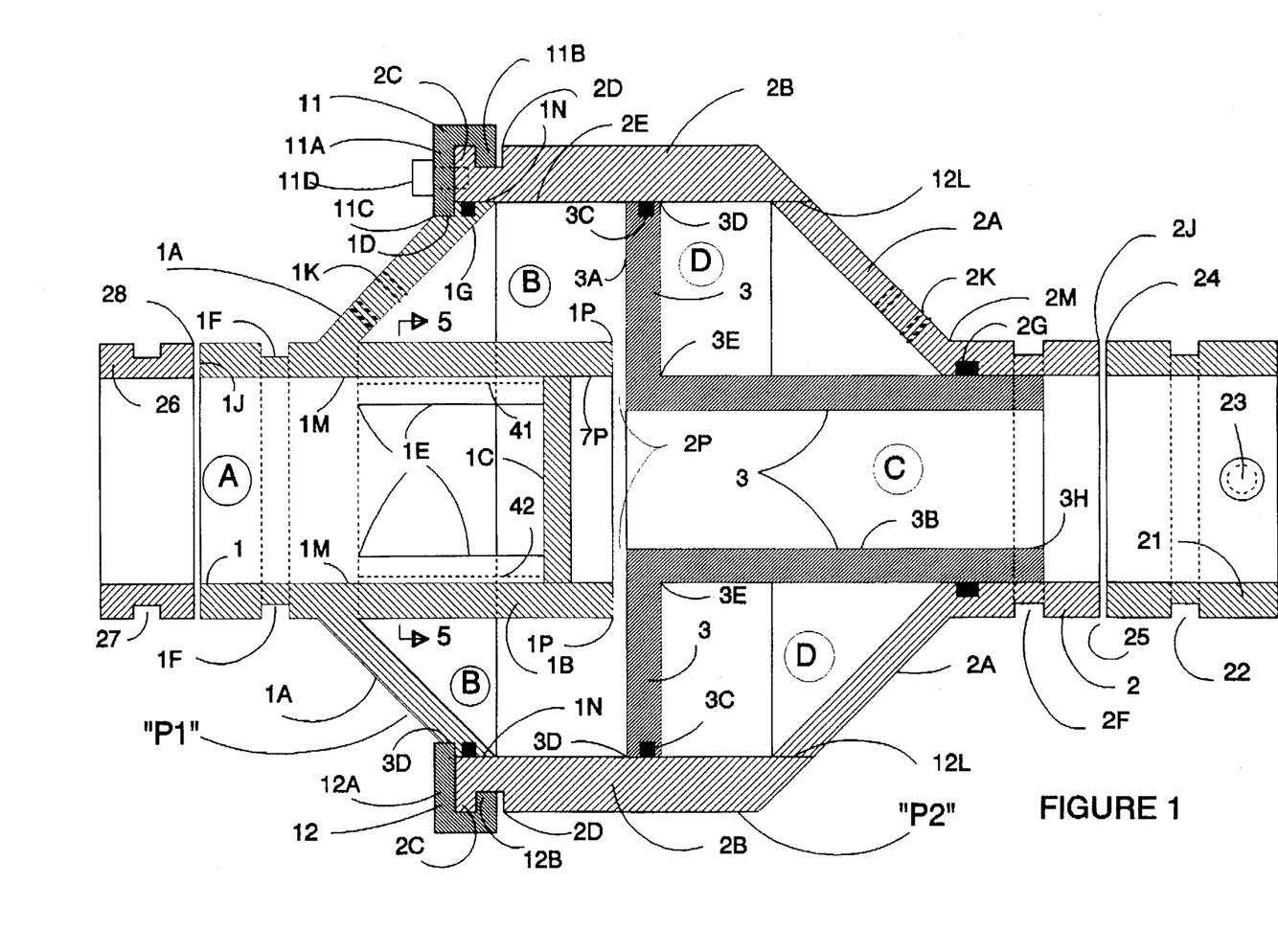
FIG. 1, is an axial vertical section through the center of a basic valve of the invention with a coupling having jaws to connect the two major parts of the valves.

FIG. 1, depicts the basic design of the valve of this invention. This Multi-use valve of the invention includes a composite valve body made of two major separable parts "P1" and "P2" held together by a separable joint 1N, the joint preferably made by a coupling patented by the inventor of this invention under U.S. Pat. No. 5,387,017, having a set of jaw members. Adjacent ends 1J of part "P1" and end 28 of incoming pipe 26 are connected by means of a coupling by engaging grooves 1F adjacent to said end 1J and groove 27 adjacent to said end 28. Part "P1" and part "P2" in FIG. 1, are connected together by a coupling, having jaw members shown as 11 and 12 from a set of four. Flat jaw pieces 11A and 11B, and 12A and 12B laterally spaced, appearing as U-shaped, are mounted around the flange 2C at the end of part "P2". Jaws 11B and 12B, are held in place by the circumferential groove 2D constructed in part "P2" and pins or bolts like 11D. The jaws 11A and 12A, are positioned in front of a circumferential flange 2C. All jaws couple 1A, as jaw 11A is shown coupling at its end 11C a circumferential groove 1D constructed in the body of member 1A. Groove 1D may be a partial groove as shown in FIG. 1, where, one shoulder of groove is missing to allow the movement of the coupling joint or it may be a full groove having both shoulders of the groove sinking into the body of member 1A to make a rigid coupling joint.

Figures 4, 5:
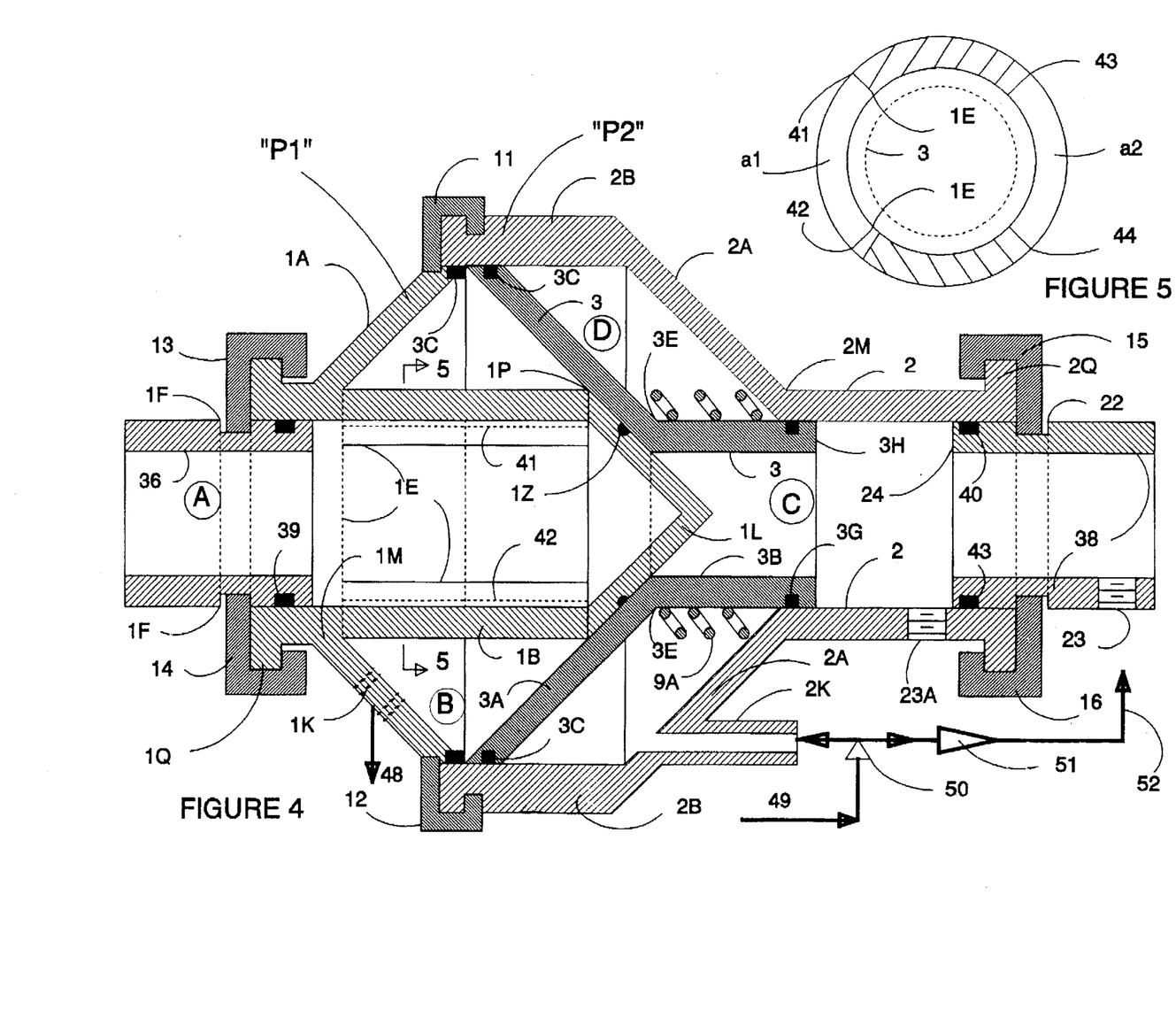
FIG. 4, is an axial vertical section through the center of the valve, its ends mounted over and around the inlet and outlet pipes, and with three couplings with jaws incorporated into the body of the valve.
FIG. 5, is transverse vertical section 5—5 shown.

Part "P1" of the valve body is preferably made of a circular tube 1, with an inlet chamber "A", and preferably is provided with a circumferential groove 1F adjacent to its end 1J, to couple the valve to the in-coming pipe 26. Down stream adjacent to groove 1F at location 1M, preferably, an integral cast truncated conical member 1A, between 1M and 1N is constructed to meet sealingly inner surface of part "P2" by its end 1N. Seal 1G is located in the groove constructed in the body of member 1A to prevent any leak through the connection at 1N. Down stream from section 1M, section 1B of tube 1 is provided with a plurality of passages. Section 5—5 taken through the passages is depicted in FIG. 5; and for simplicity, drawings show only two passages with boundaries 1E, 1E, 41 and 42; and 1E, 1E, 43, and 44. Down stream from the end of the passages, a fixed partition plate 1C or a movable partition plate 6P in FIG. 6, to block the flow of fluid, is provided. Adjacent down stream of said passages 1E, end 1P of said section 1B ends in discontinuity. The fixed partition plate 1C may be made as an integral part of section 1B of part "P1". Partition plate 1C is located at a distance as shown by 7P from end 1P. To change the flow characteristics of the valve, the geometry and location of the partition plate may change from valve to valve.

Part "P2" of the valve body holds the hydraulic gate 3 to block the flow of fluid and to shut the flow by contact of its face 3A with surface 1P. Part "P2", preferably a single cast piece, is formed by connecting two tubes, 2 and 2B, with a truncated conical member 2A between 2M and 12L. Two circumferential grooves 2D and 2F, adjacent to the end portions of members 2B and 2 of part "P2" are provided. Preferably, by means of the above patented coupling, outlet end 2J of tube 2 of part "P2" is connected to the inlet end of pipe 21 by engaging circumferential grooves 2F and 22 with the coupling.

Figure 8:
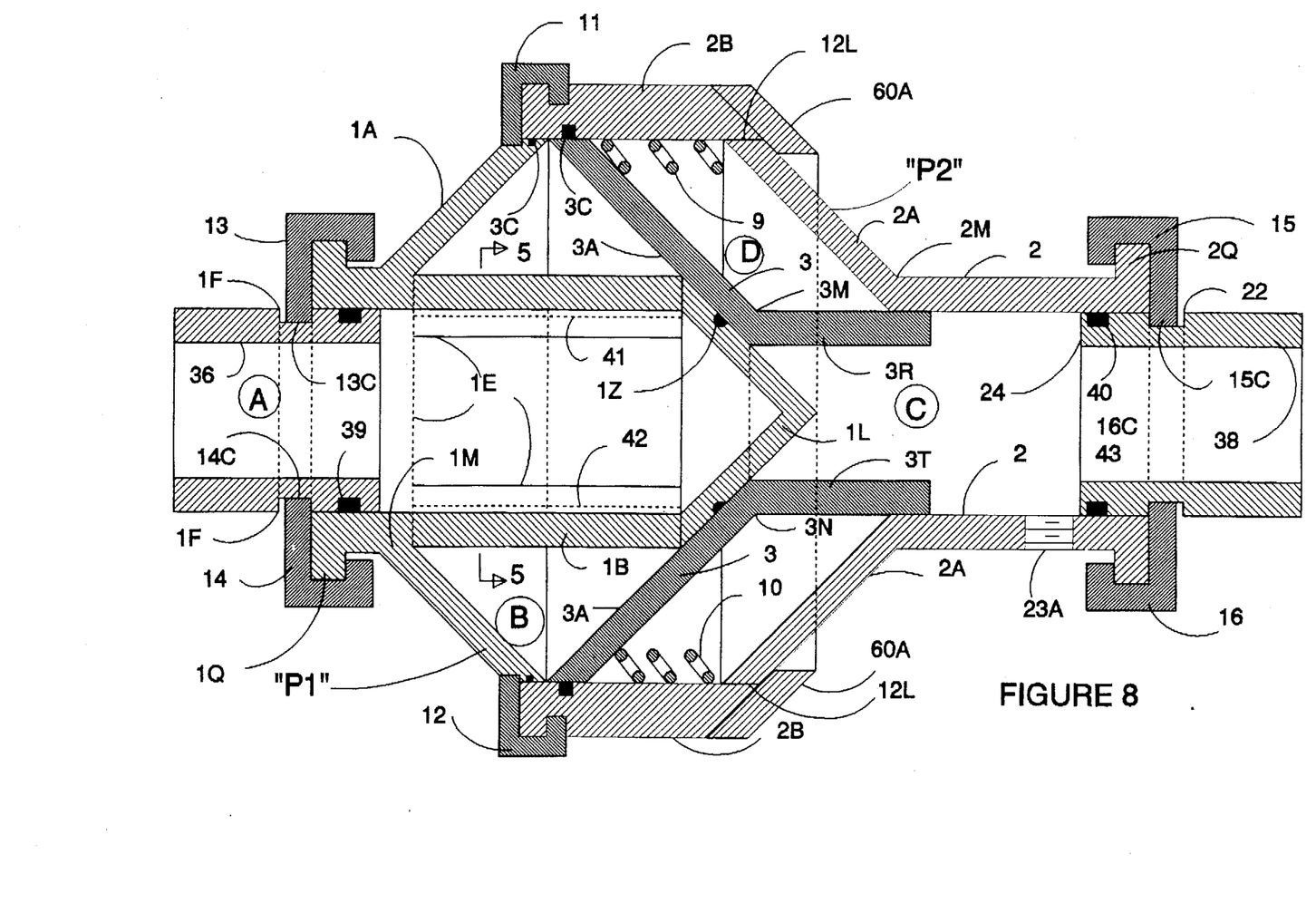
FIG. 8, is an axial vertical section of a single check valve.

In some embodiments of the valve where need to clean the valve is frequent, a second coupling may be provided at the opposite end of joint 1N in member 2B of part "P2". Thus, 2B will become a cover made of said invented coupling having partially rotable jaws on its both ends, which will couple member 1A with member 2A of the valve body, and coupling cover can be pushed away to expose the interior of the valve for cleaning purpose. The cover also can be made by providing only one coupling as shown in the drawings, while the opposite end of 2B is provided a welded or integrally cast ring 60 as shown in FIG. 8, to secure member 2A with a slip joint 12L to the rest of the valve body. Joint 12L also can be a fixed joint made by welding 2B to 2A or integrally cast.

Figure 2:
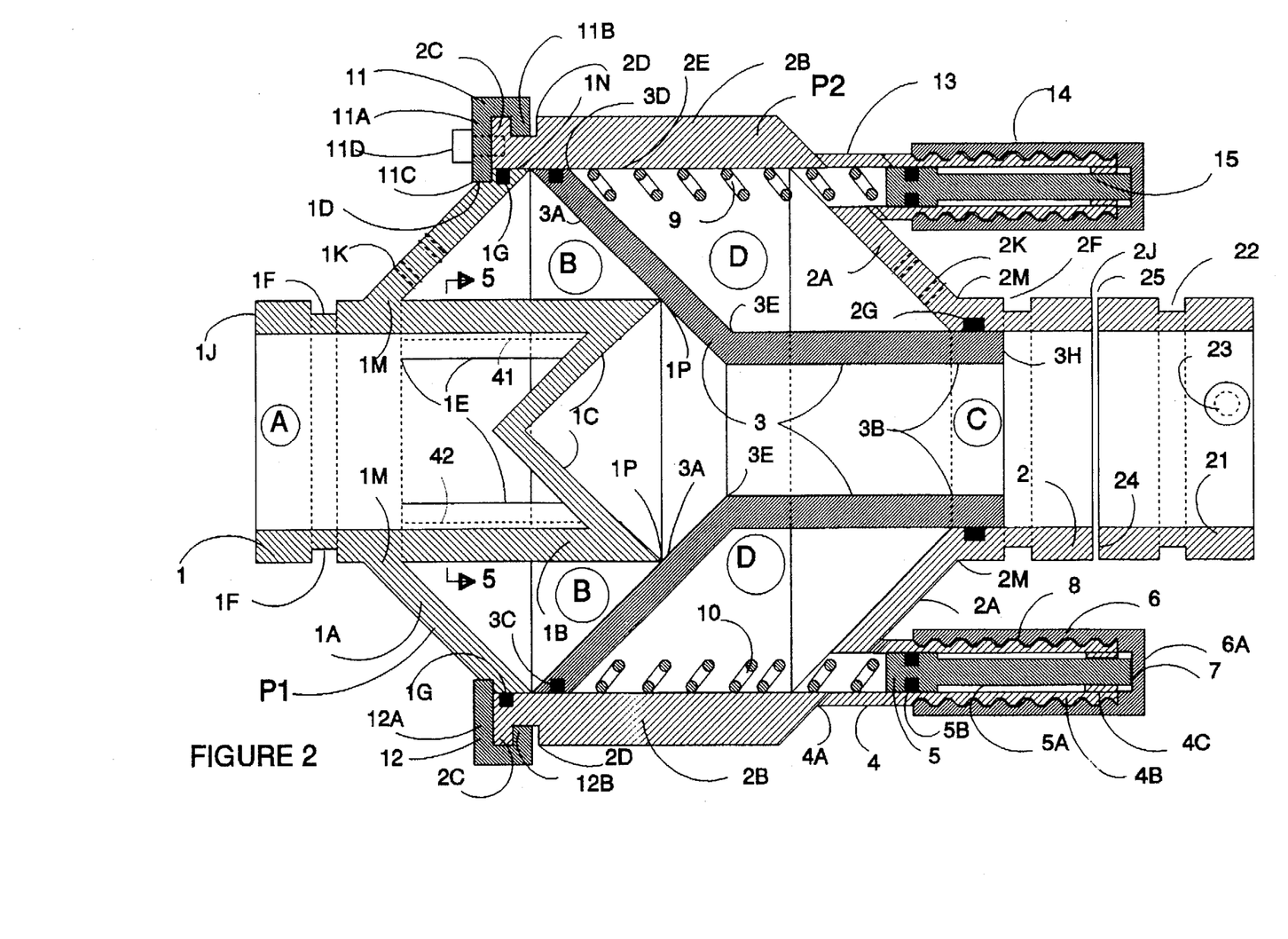
FIG. 2, is an axial vertical section through the center of the valve showing a slanting configuration of the partition wall and the gate, and also showing two spring loaded drives to close the gate or to restrict the opening of the gate.
Figure 3:
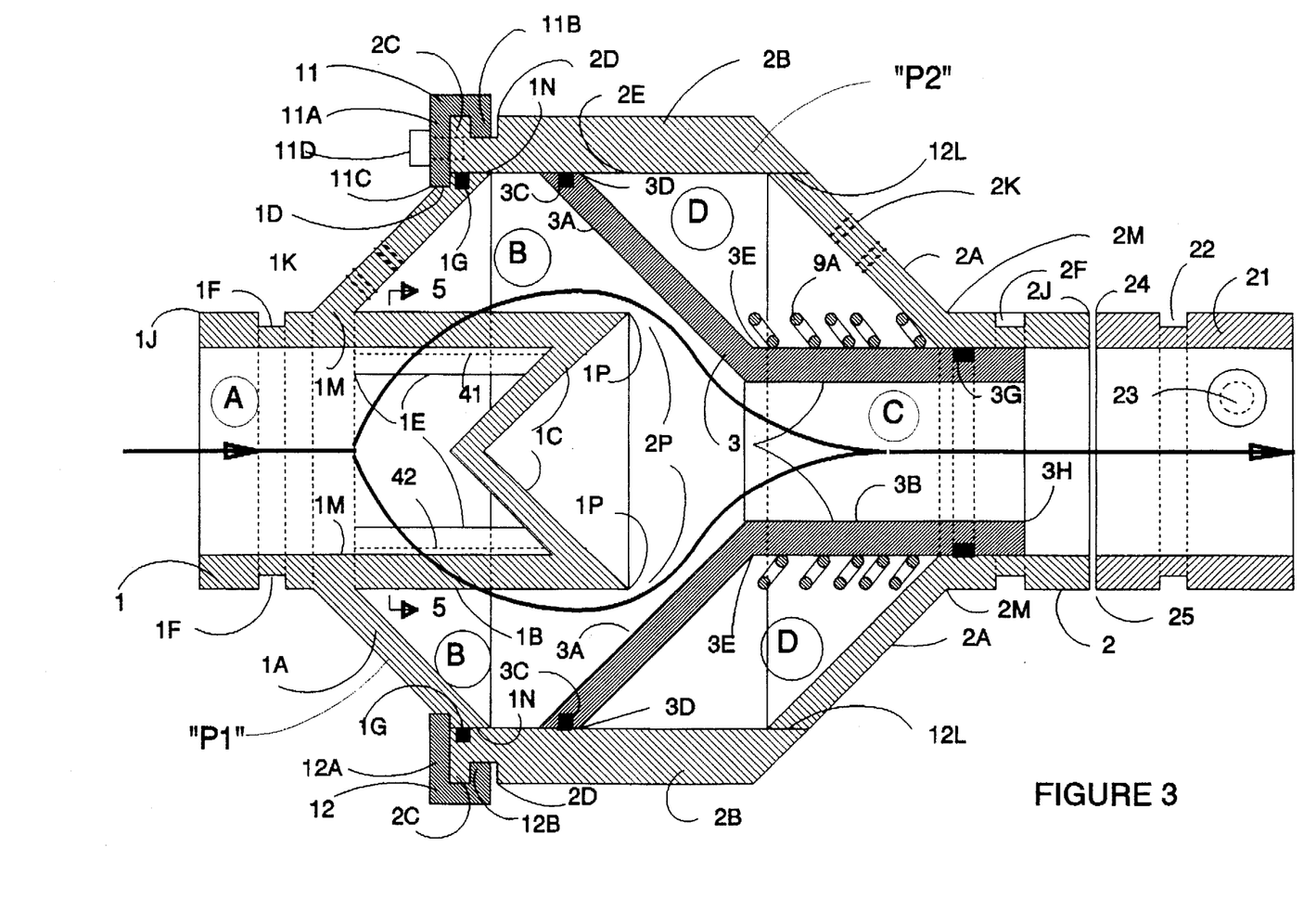
FIG. 3, is an axial vertical section through the center of the valve shown in FIG. 2, but the valve is rotated by 90 degrees, and the gate is shown in open position with flow of fluid through the valve.
Figure 9:
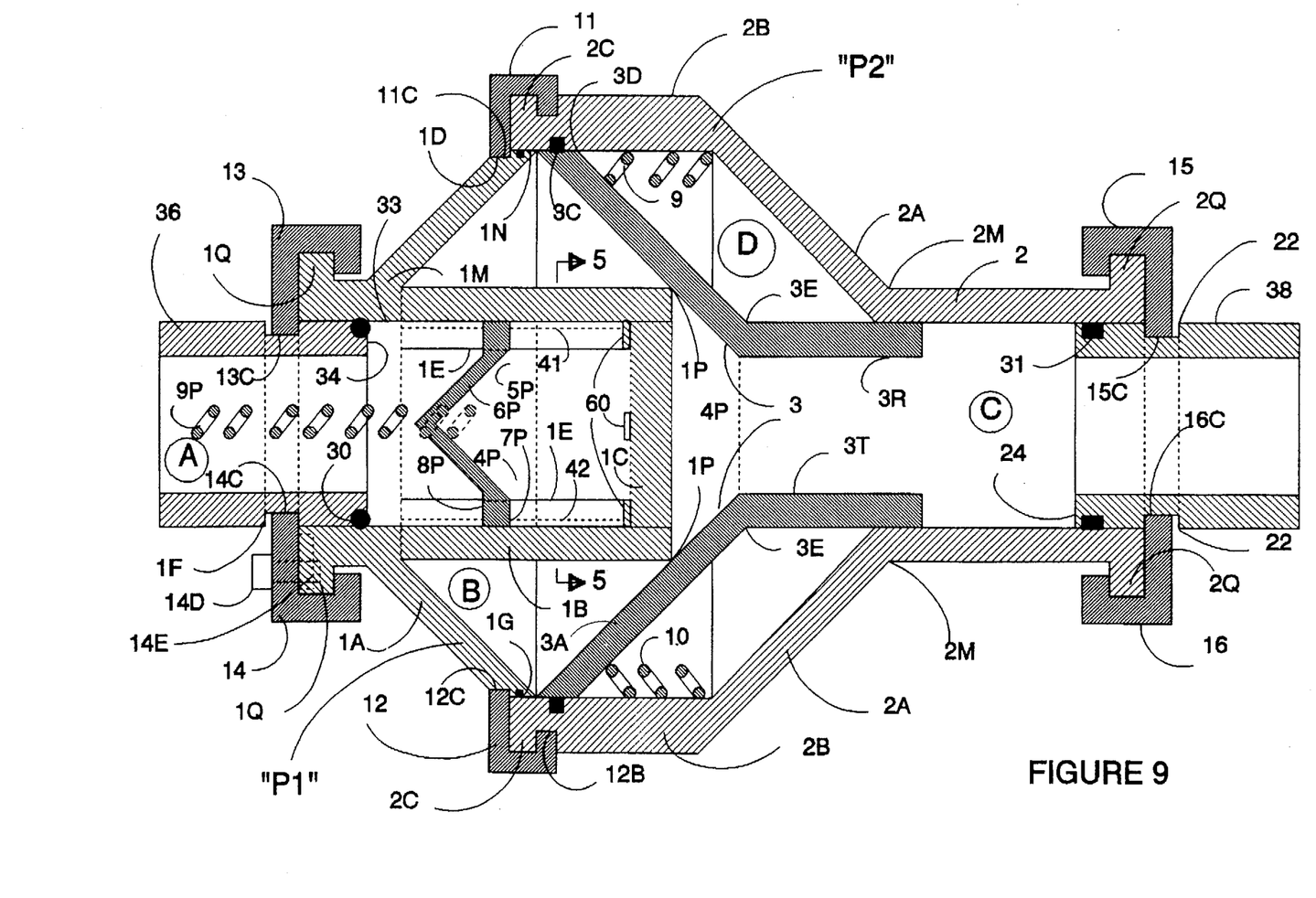
FIG. 9, is an axial vertical section of the back flow preventer, double check valve.

As shown in figures from FIG. 2, to FIG. 9, the body of hydraulic gate 3, is preferably a single piece casting, and has preferably two members; a tubular member 3B and a truncated conical section 3A, between 3E and 3D. In FIG. 1, instead of a truncated cone, member 3A is shown as a radial plate. Thus, it is clear that the geometry of member 3A of the hydraulic gate can be altered as desired. The tubular section 3B of the hydraulic gate is mounted to slide inside tube 2 of part "P2", and end 3D of truncated conical section 3A is mounted to slide against the surface 2E of tube 2B of part "P2". Two seals, 3C and 3G, are located in the grooves constructed in the body of members 3A and 3B. Seals like 3G can be located inside the groove constructed in the body of tube 2 as shown by 2G in FIG. 1. Though hydraulic gate 3 can function without any springs, for quick response compression springs of type 9A around 3B or springs of type 9 and 10 shown in FIG. 2, can be installed inside chamber D. when the valve is in a closed position the space inside the valve gets divided into four chambers A, B, C, D. Fluid enters chamber "A" from the in-coming pipe 26 (pipe 26 is shown only in FIG. 1,) and passes out of chamber "A" into intermediate chamber "B" through a plurality of passages 1E. When the gate is in a closed position, face 3A of the gate 3 block the fluid and restricts its passage at circumferential alignment 1P shown in all the figures except FIG. 4, and FIG. 8, where seal 1Z is used with partition plate 1L to show that partition plate also can project outward from chamber "A". It should be understood that the partition plate 1C at circumferential surface 1P can have slope as shown by in FIG. 4, FIG. 7, and FIG. 8, or it can be a rounded surface or it can be a vertical surface as shown in FIG. 1. It also should be understood that the contacting surface of section 3A and of partition plate 1C at 1P can be made smooth enough to make surface to surface contact an effective seal. When gate 3 is opened and it slides away from the partition plate 1C, and moves toward pipe 21, fluid flows into chamber "C" and out of the valve into pipe 21. FIG. 3, shows the fluid flow path into the valve and out of the valve.

FIGS. 1, 2, 3, and 7, depict a valve, where pipe 26 connected to inlet tube 1, and outlet tube 2 connected to pipe 21 all have the same inner diameters. FIGS. 4, 6, 8, and 9, depict a valve which is mounted over and around the outside diameters of the inlet and outlet pipes to the valve. Valve part "P1" and part "P2" are axially separable and they can slide around the inlet and outlet pipes when the coupling jaws 13, 14, members of a set of four, and jaws 15, 16 members of a set of four, mounted around flanges 1Q and 2Q, are disengaged from the circumferential grooves 1F and 22 of the pipes 36 and 38. FIGS. 1, 2, 3, and 4 show different configurations of a pressure reducing valve. In FIG. 1 partition plate 1c and member 3A of gate 3 have smooth vertically situated, radial plan plate. FIG. 2 and 3 show apex of conical partition plate 1C projected toward the inlet 1F of the valve. In FIG. 4 the apex of the partition plate 1L is projected in the reverse direction. Partition plate may assume the form of a truncated cone as well. In a case of pressure reducing valve, if the actuating chamber "D" to control gate 3 is pressurized with the fluid flowing in the pipe line, then outlet passage 1K is provided in 1A of part "P1" and inlet passage 2K to chamber "D" is provided in 2A of part "P2". In FIGS. 1, 2, 3, and 4, the valve which is shown is a pressure reducing valve.

In FIG. 4, from threaded opening 1K, fluid flows through a conduit 48 to a needle valve 49, controlling two way flow to chamber "D" through opening 2K, and also controlling, flow to a pilot control valve 51. Pilot control valve 51 is connected to opening 23 in pipe 38 through conduit 52. Opening 23 may be located in tube 2, body of part "P2" as depicted by 23A. Thus, chamber "D" can be pressurized with the fluid in intermediate chamber "B". Because of greater axially projected surface area of member 3A of chamber "D" than the axially projected area of intermediate chamber "B", a net excessive axial pressure in favor of gate 3 results; plus a spring 9A or springs 9 and 10 installed in chamber "D" contributes to the differential pressure in favor of total pressure in chamber D. When gate 3 is in open position, restriction causes a high velocity of fluid and a pressure drop, which further acts in favor of pressure in chamber "D". Thus, with the aid of pilot valve 51 in FIG. 4, pressure can be regulated in chamber "D" and at the outlet of the valve over restriction P1. Enough gap is provided in front of end 24 of pipe 38, and end 3H of gate 3 for full valve stroke. It should be understood that the valve also can operate if the flow is coming from the opposite direction to the flow as shown in FIG. 3.

FIG. 2, shows spring loaded mechanical drive assemblies 6 and 14 for the hydraulic gate. Compression springs are shown by 9 and 10. A stem made of sections 5 and 5A is mounted in the cylindrical body 4 which has restriction 4c, and has threaded section 4B. Drive cover 6 with threads 8 and end 6A is kept in touch with said stem at 7 with the push of spring 10. By rotating drive 6, stem 5A, and 5 is moved and urges the spring to exert pressure against 3A of gate 3. Stem 15 of drive 14 works similarly. Thus, the drives can restrict the opening of the gate, and also can close the gate.

FIG. 3, represents a vertical axial section at 90 degree from the section shown in FIG. 2, but seal 2G in FIG. 2 is shown as seal 3G mounted in the body of valve 3 instead of the body of Part "P2". FIG. 3, also depicts path of the fluid through chambers "A", intermediate chamber "B", and chamber "C" and into pipe 21.

In FIG. 4, seal 1Z is located in the conical partition plate away from 1P as shown in FIGS. 2 and 3. It also shows conventional means to control the valve. Two seals 39 and 40 are located inside the grooves constructed in the outer bodies of pipe 36 and 38. The operation of valve is already discussed. Tube 48 takes fluid from opening 1K and tube 49 is connected to tube 48 and at the end has needle valve 50 controlling fluid flow to chamber "D" and to pilot valve 51, which valve is in communication with the fluid in "D" and fluid in pipe 38. Thus by controlling the pilot valve the pressure and the volume of fluid in chamber "D" is controlled, and thus the opening of the gate from surface 1P.

FIG. 5, shows the vertical section 5—5 of tube 1B having two tapered passages a1 and a2 with inner openings 1E and outer openings shown by 41 and 42; and 43 and 44. It should be clear that the geometry, number, and size of the passages may vary.

Figure 6:
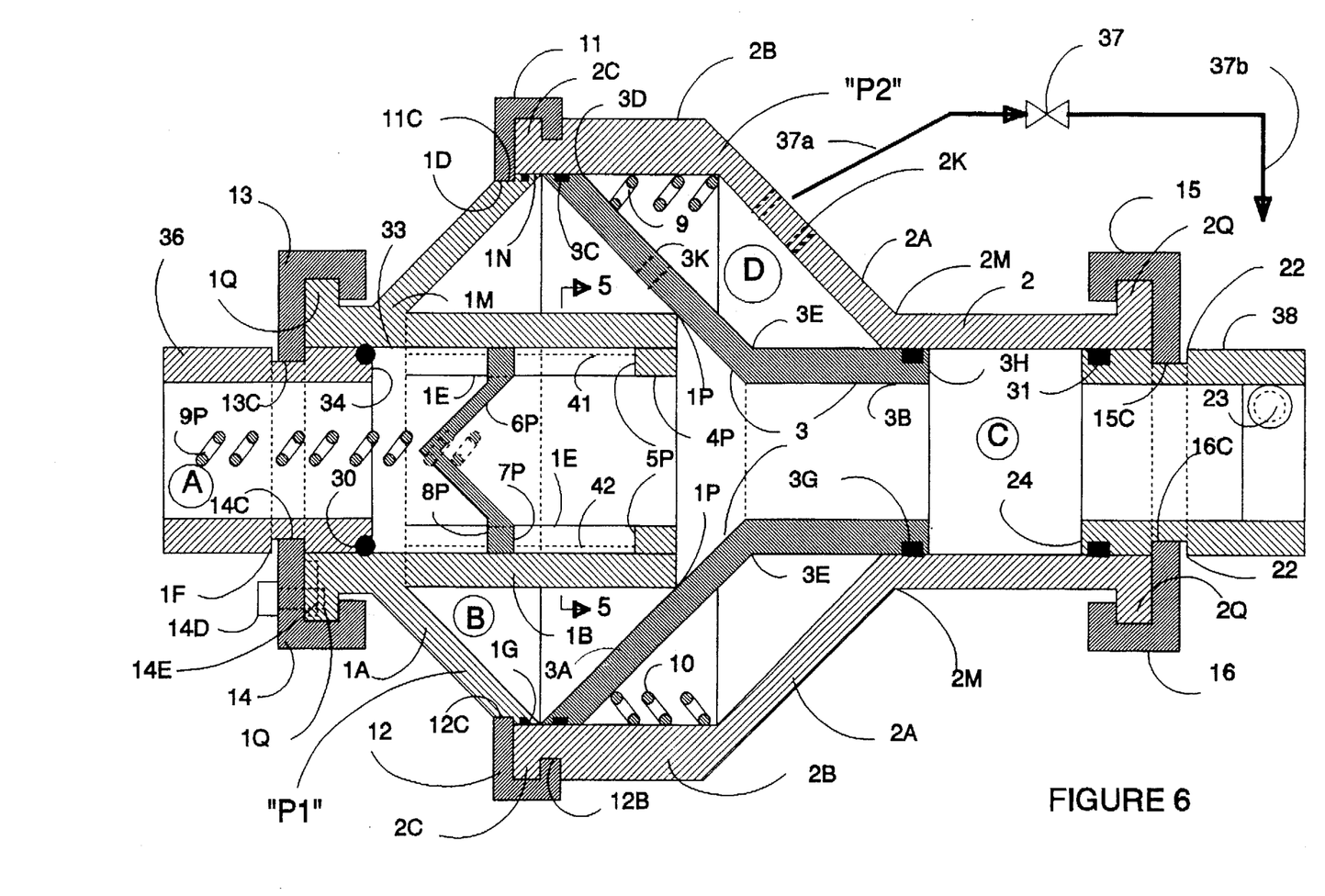
FIG. 6, is an axial vertical section of a gate valve with a check valve mounted in the inlet chamber.

FIG. 6, has the same configuration of the valve as in FIG. 4, except that the valve is for pumps and it is provided with a slidable partition plate 6P, and a blocking ring 4P. Blocking ring 4P restricts the exiting of partition plate 6P from tube 1B, and face 34 of tube 36 blocks 6P from travelling up stream. Member 3A is provided an opening 3K for the entry of fluid into chamber "D" from intermediate chamber "B". Outlet opening 2K in 2A for the outlet flow of fluid from chamber "D" is provided, and inlet opening 23 is provided in pipe 38.

Incoming fluid into chamber "A" pushes partition plate 6P against face 5P of ring 4P, and fluid moves into intermediate chamber "B", thence to chamber "D". Shutoff valve 37 located outside the valve body 2A opposite to opening 2K connects opening 2K and inlet opening 23 in pipe 38 via tubes 37A and 37B. When valve 37 is closed it does not allow outflow of fluid from chamber "D", and gate 3 remains in the closed position as shown in FIG. 6, but when valve 37 is opened fluid flows to pipe 38 through opening 23, and pressure drops in Chamber "D" and the gate opens by overcoming the opposite force exerted by the springs 9 and 10. If the electric power fails and the pump stops, the reverse flow of the fluid column pushes plate 6P against face 34 and seal 30 and fluid is blocked and kept from reaching the pump. Thus, plate 6P works as a check valve against the reverse flow. In a small valve, instead of two springs, a single spring like 9A of FIG. 3 and FIG.4, can be mounted around tube 3B of valve 3. For quick action of check valve 6P, springs 9P and opposite spring 10P (not shown) along the inner wall of tube 36 may be installed. Means to install the springs are not shown. One end of the spring may be welded to the surface of the adjoining member of the valve body or bolts and nuts may be used to secure the springs in place.

Figure 7:
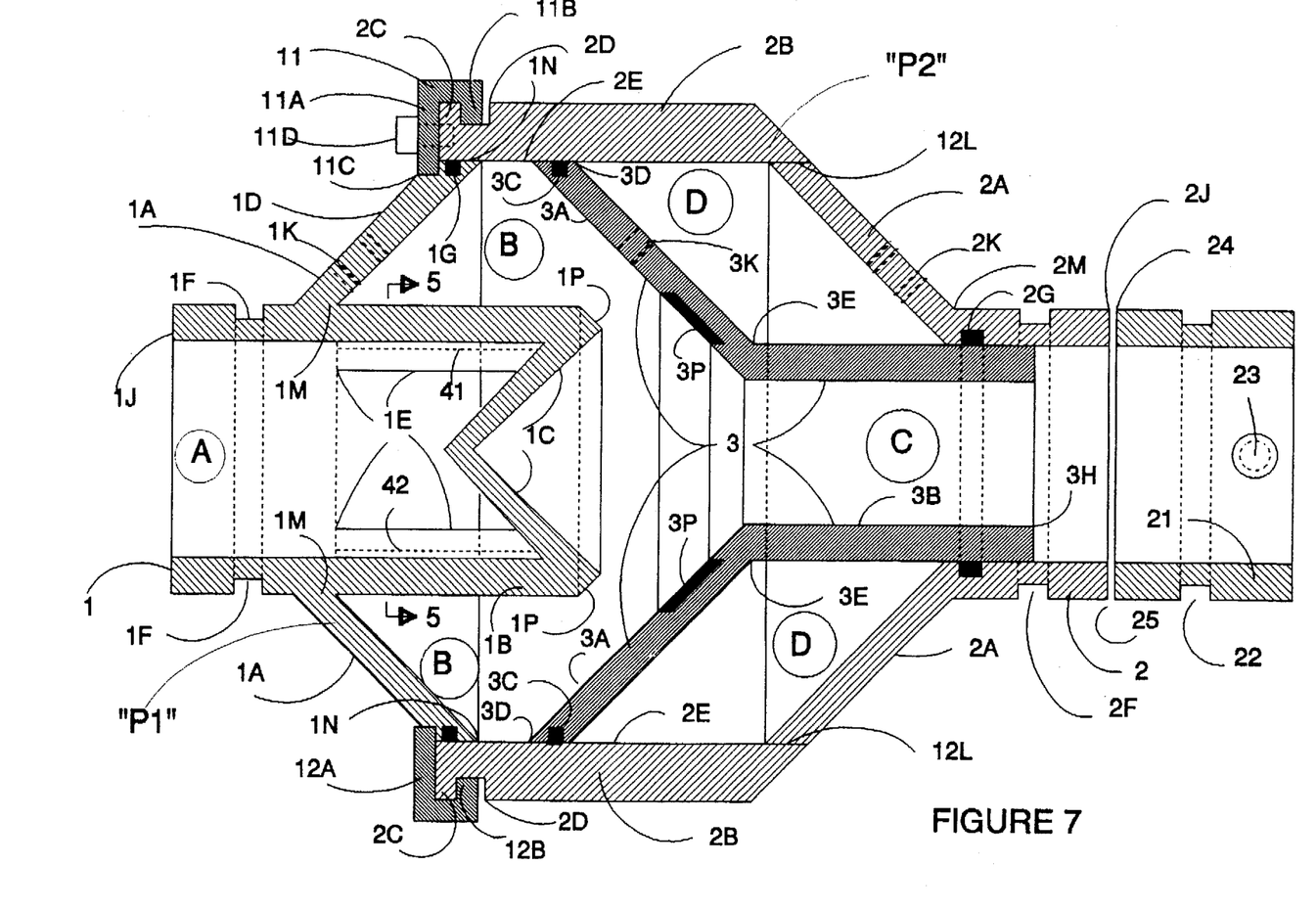
FIG. 7, is an axial vertical section of a single gate valve.

FIG. 7, is a gate valve. In principle this gate valve works exactly like the valve shown in FIG. 6, except, that partition plate 1C is fixed and its end face 1P is slanting and making the same axial angle as face 3A of gate 3. Elastomeric seal 3P, in the face of 3A of gate 3 seals fluid when gate 3 is in the closed position. Seal 3P is pressed against 1P by enough fluid pressure in chamber "D" and fluid does not leak though. It is also clear that instead of localized seal 3P, the whole face 3A of valve 3 can be provided an elastomeric cover. The functions of openings 3K, and 2K, and 23 are the same as in the valve shown in FIG. 6.

FIG. 8, shows a single check valve. It is the same valve as shown in FIG. 4, except that tube 3B in FIG. 4, is reduced to two guiding arms 3R and 3T, which fully puts chamber "D" in communication with chamber "C". If desired, more than two guiding arms can be provided emerging from section 3M. The function of said arms is to facilitate the balance and sliding of the gate. Incoming fluid flows through chamber "A" and thence to intermediate chamber "B", by overcoming the force exerted by springs 9 and 10, pushes face 3A of check valve 3 toward pipe 38, and fluid flows into chamber "C" and thence to pipe 38. If the flow of fluid reverses, then under the back pressure of the fluid and the pressure exerted by said springs, 3A sealingly moves against seal 1Z installed in partition plate 1L and seal 3C located in 2B, and reverse flow of the fluid is blocked.

FIG. 9, is a double check valve. It is exactly the same valve as shown in FIG. 6, except that tube 3B of valve 3 (in FIG. 6), is reduced to arms 3R and 3T as is done in FIG. 8, and chamber "D" and chamber "C" are put in communication. Also, tube 1B is provided a dead end partition plate 1C and ridges 60 to maintain a gape between face 7P and the inner face of plate 1C so that the fluid always fill the gap. This combination creates a back flow preventer, double check valve. Incoming fluid from chamber "A" pushes plate 6P against 1C by stretching spring means 9P, and makes entry into chamber "B" and pushes member 3A of check valve 3 toward 2A and fluid exits to chamber "C" and chamber "D" in communication with chamber "c", and thence to pipe 38. If the reverse flow of fluid occurs both check valves 3, and 6P move backward to shutoff the reverse flow by assuming their respective closing positions against 1P and seal 30 installed in face 34 of pipe 36. It is understood that the valves in FIGS. 4, 6, 8, and 9, also can be installed directly in the pipe line instead of mounting them around the pipes. Grooves can be provided adjacent to the two ends of the valve body like the valves shown in FIG. 1, 2, 3, and 7, and the valve can be mounted in the pipe line by means of said coupling invented by the inventor of this invention. In FIG. 9, upstream restriction for 6P is provided by the end 34 of pipe 36, but, when these check valves are incorporated into the design of FIGS. 1, 2, 3, and 7, a restriction ring can be placed in the gap as shown between end 1J of tube 1 and end 28 of pipe 26 at the inlet of the valve.

It is understood that the valve can be manufactured from more than one type of material. Whereas this invention is here illustrated and described with specific reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A multi-use flow control and pressure reducing valve, comprising:

a valve body having at least one joint therein dividing the valve body into at least two separable parts, part one and part two, in the axial direction, and an outer cylindrical middle portion and two opposite cylindrical end portions, said outer cylindrical middle portion having a larger diameter than the diameters of the two opposite cylindrical end portions which are attachable to inlet and outlet pipes;

part one of the valve body including the end portion connectable to the inlet pipe and having a cylindrical inlet chamber and a wall emerging radially outwardly to form a wall for an intermediate chamber surrounding the inlet chamber, said inlet chamber having passages opening from said inlet chamber into the intermediate chamber which surrounds said inlet chamber, and partition means directing flow of fluid from the inlet chamber through the passage to the intermediate chamber;

part two of the valve body including the end portion connectable to the outlet pipe and an hydraulic gate mounted to slide inside the cylindrical middle portion of the valve body and the cylindrical end portion attachable to the outlet pipe, which gate forms a wall of the intermediate chamber opposite to the wall provided by part one for said intermediate chamber, said gate forming an outlet chamber which communicates with the cylindrical end portion attachable to the outlet pipe, and a fluid actuating chamber between said hydraulic gate and said valve body, said hydraulic gate being slidable between an open position wherein the intermediate chamber and outlet chamber communicate and a closed position wherein communication between the intermediate chamber and outlet chamber is blocked;

means to couple the parts of the valve body together; and means to pressurize and depressurize the fluid actuating chamber with respect to the intermediate chamber to control the hydraulic gate.

2. A multi-use flow control and pressure reducing valve according to claim 1, wherein the means to couple the parts of the valve body together is at least one coupling.

3. A multi-use flow control and pressure reducing valve according to claim 2, wherein the valve body is split into at least two parts having mating ends, wherein the coupling has a set of jaw members incorporated into the mating end of at least one part of the valve body to be received by the mating end of the other part of the valve body, and the jaw members are movable between closed or open positions to engage or to disengage receiving means of the other part of the valve body to lock or unlock the parts of the valve body together.

4. A multi-use flow control and pressure reducing valve according to claim 3, wherein the receiving means of the other part of the valve body includes a shoulder over which the jaws move to engage said shoulder to lock the parts of the valve body together.

5. A multi-use flow control and pressure reducing valve according to claim 4, wherein the shoulder locks the parts of the valve body from separating, but allows some relative axial movement of the parts.

6. A multi-use flow control and pressure reducing valve according to claim 3, wherein the receiving means of the other part of the valve body includes a groove into which the jaws move to engage said groove to lock the parts of the valve body together.

7. A multi-use flow control and pressure reducing valve according to claim 1, wherein the hydraulic gate is made of a cylindrical tube and an outwardly extending member diverging from one end of said cylindrical tube.

8. A multi-use flow control and pressure reducing valve according to claim 7, wherein the cylindrical tube of the hydraulic gate is fitted sealingly to slide inside the cylindrical end portion of part two of the valve body, and the diverging end of the gate having a variable diameter through its length reaches sealingly to the inner surface of the outer cylindrical portion of the valve body to make the fluid actuating chamber for actuating and controlling the hydraulic gate and wherein the means to pressurize and depressurize the fluid actuating chamber is means located outside the valve body to supply pressurized fluid to the fluid actuating chamber.

9. A multi-use control and pressure reducing valve according to claim 8, wherein the diverging end of the hydraulic gate has a face, and in the gate's closed position the face establishes a sealing surface against inlet chamber structure to block the flow of fluid from the intermediate chamber to the outlet chamber.

10. A multi-use control and pressure reducing valve according to claim 9, wherein the means to pressurize and depressurize the fluid actuating chamber includes an opening through the face of the hydraulic gate to allow entry of fluid from the intermediate chamber directly to the fluid actuating chamber, and at least one spring mounted inside of the fluid actuating chamber to enhance the internal pressure against the outside fluid pressure in favor of the gate.

11. A multi-use flow control and pressure reducing valve according to claim 8, wherein the means located outside the valve body to supply pressurized fluid to the fluid actuating chamber communicates with the intermediate chamber and the outlet chamber as well as the fluid actuating chamber.

12. A multi-use flow control and pressure reducing valve according to claim 11, wherein the means located outside the valve body to supply pressurized fluid to the fluid actuating chamber includes a control valve.

13. A multi-use flow control and pressure reducing valve according to claim 1, wherein the inlet chamber includes structure which divides the intermediate chamber and the outlet chamber and provides a valve seat for the hydraulic gate when in closed position to block communication between the intermediate chamber and the outlet chamber.

14. A multi-use flow control and pressure reducing valve according to claim 1, wherein the partition means is slidably mounted in the inlet chamber to move from a position wherein the partition means directs flow of fluid substantially from the inlet chamber through the passages to the intermediate chamber to a position wherein the partition means substantially completely blocks flow of fluid through the valve in a reverse direction.

15. A multi-use flow control and pressure reducing valve according to claim 14, wherein the inlet chamber is tubular, wherein the passages are intermediate the tubular inlet chamber, and the partition means slides in the tubular inlet chamber between a blocking stop located between the end portion connectable to the inlet pipe and the passages where the partition means substantially completely blocks flow of fluid through the valve in a reverse direction and a flow stop located beyond the passages where the partition means directs flow of fluid from the inlet chamber through the passages into the intermediate chamber.

16. A multi-use flow control and pressure reducing valve according to claim 15, wherein the blocking stop and the flow stop are rings in the inlet chamber.

17. A multi-use flow control and pressure reducing valve according to claim 15, wherein the blocking stop is a ring in the inlet chamber and the flow stop is a face of a wall in the inlet chamber.

18. A multi-use flow control and pressure reducing valve according to claim 14, wherein the partition means is biased to its position wherein it substantially completely blocks flow through the valve in a reverse direction.

19. A multi-use control and pressure reducing valve according to claim 1, wherein the fluid actuating chamber is fully in communication with the outlet chamber, wherein springs are mounted in the fluid actuating chamber to bias the hydraulic gate to closed position, and wherein the means to pressurize and depressurize the fluid actuating chamber with respect to the intermediate chamber includes the full communication of the fluid actuating chamber with the outlet chamber whereby any backflow through the valve will pressurize the outlet chamber and fluid actuating chamber with respect to the intermediate chamber to hold the hydraulic gate in closed position and the valve operates as a check valve.

20. A multi-use control and pressure reducing valve according to claim 19, wherein the partition means is slidably mounted in the inlet chamber to move from a position wherein the partition means directs flow of fluid from the inlet chamber through the passages to the intermediate chamber to a position wherein the partition means substantially completely blocks flow of fluid through the valve in a reverse direction to configure the valve as a double check valve.

21. A multi-use flow control and pressure reducing valve according to claim 1, additionally including auxiliary control means in addition to the means to pressurize and depressurize the fluid actuating chamber to manually control the hydraulic gate.

22. A multi-use flow control and pressure reducing valve according to claim 21, wherein the auxiliary control means includes means for biasing to a desired degree the hydraulic valve toward closed position.

* * * * *